United States Patent [19]

Barthold et al.

[11] Patent Number: 5,472,617
[45] Date of Patent: Dec. 5, 1995

[54] METHOD OF DEMULSIFYING CRUDE OIL AND WATER MIXTURES WITH COPOLYMERS OF ACRYLATES OR METHACRYLATES AND HYDROPHILIC COMMONOMERS

[75] Inventors: Klaus Barthold, Mannheim; Richard Baur, Mutterstadt, bothof, Germany; Stevano Crema, Denville, N.J.; Knut Oppenlaender, Ludwigshafen, Germany; Juergen Lasowski, Tokyo, Japan

[73] Assignee: BASF Aktiengesellschaft, Germany

[21] Appl. No.: 175,935

[22] Filed: Dec. 27, 1993

Related U.S. Application Data

[63] Continuation-in-part of Ser. No. 905,130, Jun. 24, 1992, abandoned.

[30] Foreign Application Priority Data

Oct. 18, 1986 [DE] Germany .......................... 36 35 489.9

[51] Int. Cl.[6] .................................. B01D 17/04
[52] U.S. Cl. .................. 210/708; 210/734; 252/340; 252/344; 252/358
[58] Field of Search ................... 210/708, 734; 252/340, 344, 358

[56] References Cited

U.S. PATENT DOCUMENTS

| 3,483,170 | 12/1969 | van der Meij et al. | 525/330.1 |
|---|---|---|---|
| 3,652,497 | 3/1972 | Junas et al. | 525/328.8 |
| 4,626,379 | 12/1986 | Buriks et al. | 252/358 |
| 4,678,599 | 7/1987 | Fock et al. | 252/358 |
| 4,741,835 | 5/1988 | Jacques et al. | 252/358 |
| 4,968,449 | 11/1970 | Stephenson | 252/358 |

*Primary Examiner*—Bernard Lipman
*Attorney, Agent, or Firm*—Nixon & Vanderhye

[57] ABSTRACT

A method of demulsifying a crude oil and water composition involves adding demulsifiers made from acrylic acid/methacrylic acid copolymerized with hydrophilic monomers.

14 Claims, No Drawings

METHOD OF DEMULSIFYING CRUDE OIL AND WATER MIXTURES WITH COPOLYMERS OF ACRYLATES OR METHACRYLATES AND HYDROPHILIC COMMONOMERS

This is a continuation-in-part of copending application(s) Ser. No. 07/905,130 filed on Jun. 24,1992 now abandoned.

FIELD OF THE INVENTION

The present invention relates to novel copolymers based on hydrophobic acrylates or methacrylates and their use as oil demulsifiers for the rapid dehydration of crude oils.

BACKGROUND OF THE INVENTION

After an initial phase in which virtually pure crude oil is recovered, the major part of the crude oil produced is obtained as a water-in-oil emulsion.

Before transportation, the water must be separated off or reduced to an acceptable concentration. This is generally done by adding oil demulsifiers, separation being facilitated and accelerated by heating the crude oil. The compositions of the crude oil emulsions vary greatly depending on the source; hence, a large number of different oil demulsifiers are used worldwide in order to achieve optimum demulsification results. However, there is great interest in improved demulsifiers to provide more rapid separation into oil and water and give good residual amounts of water and salt when used with a very wide variety of crude oil emulsions.

The most frequently used demulsifiers are ethylene oxide/propylene oxide block polymers, oxyalkylated alkylphenol/formaldehyde resins, oxyalkylated polyamines and in particular crosslinked products of the above basic classes with multifunctional reagents, eg. diisocyanates, dicarboxylic acids, bisglycidyl ethers and di- and tri- methylolphenol.

Polymeric oil demulsifiers have also been disclosed (Canadian Patent 1,010,740 and De-Cl 33 38 923).

According to this Canadian patent, oxyalkylated alcohols and oxyalkylated alkylphenol/formaldehyde resins are etherified with unsaturated glycidyl compounds (eg. glycidyl acrylate), esterified with maleic anhydride or fumaric acid or transesterified with acrylates or methacrylates in order to introduce unsaturated functions which can be subjected to free radical polymerization and are polymerized in a subsequent reaction with other monomers in solution. DE-Cl 33 38 923 describes products which are obtained by copolymerizing polyoxyalkylene ethers of allyl or methallyl alcohol with vinyl esters or acrylates or methacrylates.

All these products have weaknesses with regard to their activity or arising from the preparation process. For example, the use of glycidyl compounds for introducing the unsaturated function during the polymerization frequently results in the formation of gels and inhomogeneities, derivatives of allyl alcohol, methallyl alcohol and maleic acid give rise to poor copolymerization conditions, and difficulties are encountered in the transesterification with acrylates or methacrylates with regard to complete, selective esterification of the oxyalkylated starting alcohols, some of which are multifunctional.

Furthermore, the copolymers frequently undergo reactions leading to gelling and solidification, particularly where multifunctional starting alcohols are used in the oxyalkylation. However, products having high potential activity and a broad spectrum of uses are obtainable precisely through the use of oxyalkylated multifunctional alcohols.

We have found, surprisingly, that copolymers which are suitable as oil demulsifiers and are obtained from hydrophobic acrylates or methacrylates, whose alcohol component is derived from a mixture of polyglycols and polyglycol ethers, with hydrophilic ethylenically unsaturated comonomers have a long shelf life and high efficiency if, in this copolymer (i) all or virtually all of the free OH groups are etherified, esterified or converted to urethane groups and/or (ii) the acid used as a catalyst during the esterification is neutralized by adding an amine.

The mixture of polyglycols and glycol ethers used for the esterification consists as a rule of oxyalkylates of the formula

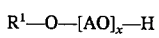

$$R^1-O-[AO]_x-H$$

where $R_1$ is a radical of a monohydric or polyhydric alcohol or alkylphenol or a radical of an alkylphenol/formaldehyde or alkylphenol/acetaldehyde condensate, AO is an ethylene oxide, propylene oxide or 1,2-butylene oxide radical, a mixture of these radicals or blocks of these radicals, and X is from 5 to 120.

The present invention relates in particular to copolymers in which

A) acrylates or methacrylates of oxyalkylates of the formula

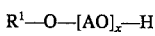

$$R^1-O-[AO]_x-H$$

where $R^1$, AO and x have the above meanings are copolymerized with

B) hydrophilic comonomers of the formula

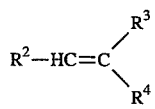

$$R^2-HC=C{\overset{R^3}{\underset{R^4}{}}}$$

where
$R^2$ is hydrogen,

$-COOH$, $-COOC_2H_4OH$, $-COOC_2H_4N(C_2H_5)_2$,

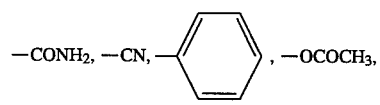

$-CONH_2$, $-CN$, —⟨phenyl⟩, $-OCOCH_3$,

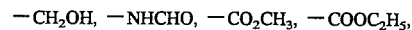

$-CH_2OH$, $-NHCHO$, $-CO_2CH_3$, $-COOC_2H_5$,

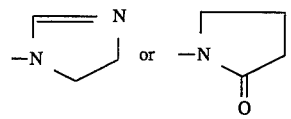

$R^3$ is hydrogen or —COOH and $R^4$ is hydrogen or —CH$_3$, with the proviso that one or more of the groups $R^2$ and $R^3$ is a hydrophilic group, the weight ratio of A) to B) being from 300:1 to 1:50, and C) the free OH groups are converted to an unreactive form by etherification, esterification or urethane formation, and/or the acid used as a catalyst in the preparation of the ester in A) and/or in the esterification in C) is neutralized with a tertiary amine.

The conversion of the free OH groups can also be carried out before the polymerization, and some of them may even be converted before the preparation of the ester comonomer.

The copolymers are prepared in a conventional manner, for example by free radical copolymerization in solution, emulsion or suspension.

The esterification of the acrylic acid or methacrylic acid is preferably effected in the presence of an acidic esterification catalyst and using an entraining agent.

Suitable esterification catalysts are conventional inorganic or organic catalysts, such as sulfuric acid, p-toluenesulfonic acid, dodecylbenzgnesulfonic acid, hydrochloric acid or acidic ion exchangers.

Examples of entraining agents are conventional organic solvents which form an azeotrope with water, in particular xylene or toluene.

Examples of suitable agents for the etherification of the free OH groups are methyl iodide, dimethyl sulfate and benzyl chloride.

Carboxylic anhydrides, such as acetic anhydride, maleic anhydride, phthalic anhydride or succinic anhydride, are preferably used for esterifying the free OH groups.

The conversion of the free OH groups to urethane groups, ie. the preferred reaction of the copolymerization, is advantageously carried out in a conventional manner by the action of isocyanates, for example using phenyl isocyanate or stearyl isocyanate.

To neutralize the acids used as an esterification catalyst, amines, preferably tertiary amines, are added. Specific examples of suitable amines are triethylamine, tributylamine, dimethyl-Cy-amines (where y is $C_8$–$C_{18}$) and triethanolamine.

Specifically, the following procedure is adopted, for example, in the preparation of the novel polymers. Preparation of the oxyalkylates of the formula $R^1$—O—[AO]—H
a) Preparation of the oxyalkylated alcohols The oxyalkylated alcohols are prepared in a conventional manner by reacting the monofunctional or multifunctional alcohol with an alkoxyide or a mixture of several alkoxides or blocks of several alkoxides, using a basic catalyst at from 80° to 160° C. Examples of suitable alcohols are ethanol, butanol, isopropanol, tallow fatty alcohol, stearyl alcohol, alkylphenols of the general formula

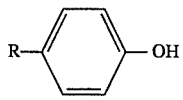

where R is, for example, $C_9H_{19}$, $CH_3$, $CH(CH_3)_2$, $C(CH_3)_3$ or $C_8H_{17}$, ethylene glycol, propylene glycol, bisphenol A, glycerol, trimethylolpropane, pentaerythritol, sorbitol, polyglycerol or the alkylphenol/formaldehyde or acetaldehyde condensates described below.

Preferred alkoxides are ethylene oxide, propylene oxide and 1,2-butylene oxide or mixtures of these.

The reaction conditions vary depending on the type and amount of the alkoxides used. In general, the reaction temperature is from 80° to 160° C., and the amount of basic catalysts varies from 0.25 to 5%, potassium hydroxide and sodium hydroxide being preferred. Depending on the consistency of the starting alcohol and end product, an inert solvent which does not influence the reaction may be added to effect dilution. Xylene is preferred.

The ratio of alcohol to alkoxide(s) can vary greatly but is advantageously from 1:120 to 1:5.
b) Oxyalkylated alkylphenol.formaldehyde or acetaldehyde condensates The alkylphenol/formaldehyde or acetaldehyde resins used as alcohols for the oxyalkylation are prepared in a conventional manner by reacting the aldehyde with the alkylphenol in a ratio of from 2:1 to 1:2, preferably 1:1.05, by a base-catalyzed or acid-catalyzed reaction, preferably the latter, at from 80° to 250° C., using a high boiling solvent for completely removing the resulting water of reaction in the form of an azeotrope. The alkylphenol used is, for example, nonylphenol, tert-butylphenol or octylphenol, and preferably used aldehydes are formaldehyde and acetaldehyde. In general, an alkylsulfonic acid or alkylbenzenesulfonic acid, eg. dodecylbenzenesulfonic acid is preferably used as the catalyst, in an amount of from 0.2 to 2%, preferably from 0.2 to 0.5%.

At the beginning of the reaction, the temperature is kept at 90°–120° until the major part of the water of reaction has distilled off. Thereafter, the mixture is heated to the boiling point of the solvent in order to complete the reaction, and the residual amount of water is removed as an azeotrope. The molecules contain on average from 4 to 12, preferably from 5 to 9, aromatic nuclei.

The condensates thus obtained are oxyalkylated as stated under a).
c) Conversion of some of the free OH groups of the alkoxides from a) and b)

When the oxyalkylation is complete, the alkoxides from step a) or b) can be reacted in order to block some of their terminal groups, blocking of from 20 to 90% of the terminal OH groups being preferred. This step can be carried out by acid-catalyzed esterification with a carboxylic anhydride, preferably acetic anhydride, phthalic anhydride, succinic anhydride or maleic anhydride, at from 50° to 130° C., or by reacting the alcoholates with dimethyl sulfate, benzyl chloride or methyl iodide, the alkylating agent being added to the sodium or potassium alcoholates at from 40° to 80° C., and by reaction with isocyanates.
A) Conversion of the oxyalkylates to monomers Since the demulsifiers for crude oil emulsions must be surfactants, the extent of their hydrophilic or hydrophobic nature is adjusted via the ratio of the polyethylene oxide block (hydrophilic) to the polypropylene oxide block (hydrophobic) to the hydrophilic comonomers (eg. acrylic acid). Since, in order to achieve maximum efficiency, these products must be soluble in crude oil, it is important that hydrophilic polyacrylic acid moiety in the copolymer is kept in solution in an aromatic solvent (eg. toluene, xylene or a mixture of aromatics) by a large hydrophobic radical. This is achieved only by complete, selective introduction of a functional group which can be subjected to free radical polymerization into the hydrophobic oxyalkylated alcohol, some of whose terminal groups may be blocked, and the use of the said alcohol in the subsequent free radical copolymerization with hydrophilic comonomers.

To introduce the unsaturated functional groups into the said alcohols, the latter are esterified with acrylic acid or methacrylic acid in the presence of an acidic catalyst (eg. p-toluenesulfonic acid, sulfuric acid or dodecylbenzenesulfonic acid) at from 80° to 150° C., the necessary complete removal of the water of reaction being effected by means of an azeotropic entraining agent, preferably toluene or xylene.

In order to prevent polymerization during the esterification, it is advisable to use stabilizers which are known per se (preferably hydroquinone monomethyl ether). The ratio of the oxyalkylated alcohol to acrylic acid or methacrylic acid may be varied from 1:1 to 1:n, where n is the functionality (ie. the number of hydroxyl groups) of the starting alcohol. A ratio of 1:1 is preferred, since otherwise gelling may be observed during the subsequent polymerization. Complete esterification of the acrylic acid or methacrylic acid is advantageously monitored by analytical methods (eg. the acid number). The amount of stabilizer varies from 0.3 to 2% by weight and is preferably 1% by weight, the percentages being based on the amount of acrylic acid or methacrylic acid. The acid catalyst is added in an amount from 0.5 to 5, preferably from 2 to 3%, by weight. Equally good esterification results are obtained by using acrylic anhydride or methacrylic anhydride and acryloyl chloride or methacryloyl chloride. In this procedure, removal of the water by azeotropic distillation is dispensed with.

The weight ratio of the solvent to the total amount of oxyalkylated alcohol and unsaturated carboxylic acid can vary from 30:70 to 70:30, a ratio of from 50:50 to 30:70 being preferred.

After esterification with acrylic acid or methacylic acid, any hydroxyl functions still present can be blocked using carboxylic anhydrides and isocyanates. Phthalic anhydride, acetic anhydride and maleic anhydride are preferred. All of the hydroxyl groups can be blocked by using equimolar amounts of anhydrides, alkylating agents or isocyanates, or at least some of the hydroxyl groups can be blocked. Preferably, from 70 to 100% of the terminal hydroxyl groups still present are converted. The anhydride or isocyanate is added to the solution of the acrylate or methacrylate, in the presence or absence of a catalyst, and, depending on the reactivity, the reaction is complete in the course of from 0.5 to 5 hours and from 70° to 120° C.

When the esterification is complete, the added catalytic amounts of acid can be neutralized by adding equimolar amounts of amines, eg. triethanolamine, triethylamine or tributylamine. However, the acids are preferably neutralized after polymerization and any condensation have been carried out.

B) Copolymerization of the oxyalkylate monomers from A) with hydrophilic comonomers The copolymers can be prepared by solution, emulsion or precipitation polymerization, solution polymerization in a nonpolar solvent (such as toluene or xylene), being preferred. The comonomer or a mixture of several comonomers is added to, or introduced dropwise to a solution of the esterified, oxyalkylated alcohol in which the terminal groups may have been blocked, or a mixture of several different esterified oxyalkylated alcohols from A) in which the terminal groups may have been blocked, and the reaction is carried out with the aid of known free radical initiators at from 60° to 140° C. Typical comonomers are acrylic acid, methacrylic acid, maleic anhydride, hydroxyethyl acrylate, N,N-diethylaminoethyl acrylate, acrylamide, acrylonitrile, vinyl acetate, allyl alcohol, vinylformamide, vinylimidazole, vinylpyrrolidone, fumaric acid, maleic acid, N,N-dimethylacrylamide and vinyl methyl ether, acrylic acid, possibly as a mixture with other comonomers in a ratio of from 10:1 to 1:1, being preferred.

Suitable free radical initiators are, as a rule, 2,2'-azobisisobutyronitrile (AIBN), dibenzoyl peroxide, tert-butyl peracetate and 2,2-azobis-2,4-dimethylvaleronitrile, AIBN and dibenzoyl peroxide being preferred. The amount of free radical initiators used is, as a rule, from 0.1 to 2% by weight, based on the total monomer content. In order to achieve a very low concentration of residual monomers, a reaction time corresponding to five times the half life of the initiator at the chosen reaction temperature is preferable. The exothermic copolymerization can be optimized in respect of the heat of reaction, molecular weight distribution and residual monomer content by the dropwise addition of the free radical initiator, in the presence or absence of known molecular weight regulators, such as mercaptans or aldehydes, and with or without the simultaneous addition of (one part) of the comonomer. A single initial addition of from 0.1 to 0.8% by weight of AIBN to the solution of the ester and of the comonomer and polymerization at from 60° to 90° C. in the course of from 2 to 5 hours, as well as a continuous metering of AIBN to the solution of the ester and comonomer (with or without initial addition of AIBN to the solution) in the course from 0.5 to 3 hours at from 60° to 90° C., in the presence or absence of molecular weight regulators, such as mercaptans or aldehydes, in amounts of from 0.05 to 1% by weight, based on the comonomer, are preferred. The simultaneous use of several esterified oxyalkylated alcohols in which the terminal groups may be blocked, and the addition or metering of several comonomers, are also possible but do not constitute a preferred procedure. The polymerization concentrations are from 20 to 70, preferably from 40 to 60%, by weight. To obtain efficient products, it is sometimes advisable to carry out a preliminary polymerization of the hydrophobic ester of the oxyalkylated alcohol and acrylic acid or methacrylic acid, in which the terminal groups may be blocked, in the course of from 1 to 2 hours using the above free radical initiators, and then to add or continuously meter in the comonomer over from ⅓ to ⅔ of the reaction time, possibly with additional radical initiator.

The K values of the resulting polymers are in general from 15 to 60 (measured in 1% strength solution in xylene). the molecular weight can be influenced by adding conventional regulators, such as aldehydes or thio compounds (eg. thioethanol or thioglycolic acid). Crosslinking by bifunctional comonomers, such as methylenebixsacrylamide, can also be used to increase the molecular weight.

C) Blocking of terminal groups and/or neutralization of the catalytic amounts of acid after polymerization is complete In order to increase the efficiency and in particular to prolong the shelf life of the copolymers, it is advisable to carry out partial intramolecular esterification when polymerization is complete, or final blocking of any remaining free hydroxyl functions by reaction with anhydrides or isocyanates, and/or neutralization of any remaining catalytic amounts of acid with amines in order to avoid transesterification reactions, which may lead to gelling of the products.

Partial intramolecular condensation can be effected by heating the polymerization solution from B) to 100°–140° C. in the course of from 1 to 5 hours. Preferably, the polymerization solution in xylene from B) is heated for two hours at from 110° to 120° C. Further condensation may result in gelling.

The reaction of the free OH groups with anhydrides and isocyanates can be carried out directly after the polymerization or after partial intramolecular condensation, blocking of some of the remaining hydroxyl groups after the polymerization and subsequent condensation with azeotropic entraining agents with removal of water also being possible. A preferred procedure comprises blocking of all the terminal groups after partial intramolecular condensation at from 110° to 120° C. and/or blocking of from 60 to 80% of the hydroxyl groups present directly after polymerization with subsequent condensation by azeotropic removal of the water of reaction with the aid of an entraining agent, preferably xylene.

Blocking of the end groups is effected by adding or metering the desired amount of anhydride or isocyanate to the polymerization solution and heating the mixture to 70°–120° C. in the course of from 0.5 to 5 hours, in the presence or absence of a conventional catalyst. Preferred esterifying agents are acetic anhydride, phthalic anhydride and succinic anhydride.

If the terminal groups have already been blocked at the stage of the oxyalkylates or of the hydrophobic acrylates or methacrylates, condensation with the aid of an azeotropic entraining agent after the polymerization is preferred.

The neutralization of remaining catalytic amounts of acid from the esterification stage with amines is carried out in addition or alternatively to the blocking of the terminal groups. The neutralization is preferably effected after polymerization, condensation and any blocking of terminal groups with anhydrides or isocyanates are complete, with the result that esterification reactions which proceed to a further stage and may produce gelling are prevented.

Any catalytic traces of acid from the esterification reaction which are still present are neutralized by adding equimolar amounts of amines, eg. triethanolamine, tributylamine or triethylamine, to the solution of the polymer, in which the terminal groups may have been blocked, and carrying out the reaction for 2 hours at from 20° to 80° C. Complete neutralization can be detected via the amine number.

D) Modification of the polymer from B) and C) (optional)

In order to increase their efficiency and adapt them to the particular crude oil to be treated, it may be useful subsequently to modify the copolymers obtained under B) and C). Depending on the comonomers used in the copolymerization, the product may be modified in the following ways:

1) Mixing with an oxyalkylated alcohol or a mixture of several oxyalkylated alcohols, such as those obtained as described under a), or with other copolymers from B) and C) in a ratio of from 10:90 to 90:10, preferably from 50:50 to 80:20. Better efficiencies can also be obtained by adding cosurfactants to the copolymers in amounts of from 5 to 30% by weight. Examples of such cosurfactants are dodecyl bisulfate, alkylbenzenesulfonates and alkylnaphthalenesulfonates.

2) The molecular weight can be increased by subsequent crosslinking with multifunctional crosslinking reagents which react with reactive groups of the copolymer. The crosslinking reactions are carried out (depending on the type of crosslinking agent) using from 0.1 to 10, preferably from 1 to 4%, by weight of multifunctional components at from 80° to 140° C. For example, the following multifunctional crosslinking agents are used, depending on the comonomers employed: bisglycidyl ethers (preferably bisglycidyl ethers of bisphenol A), multifunctional alcohols (eg. sorbitol or ethylene glycol), diisocyanate (eg. toluene diisocyanate) and similar compounds which react with reactive centers on the copolymer.

3) Subsequent oxyalkylation with an alkoxide, a mixture of several alkoxides or blocks containing different alkoxides. The copolymers from B) and C) are reacted with the alkoxide(s) using basic catalysts (preferably sodium hydroxide or potassium hydroxide) in amounts of from 0.5 to 5% by weight and at from 100° to 150° C. Preferred alkoxides are ethylene oxide, propylene oxide and 1,2-butylene oxide, the ratio of copolymer to alkoxide varying from 5:95 to 95:5.

4) Quaternization of N-containing copolymers with known quaternizing agents, such as dimethyl sulfate or methyl iodide, at from 50° to 120° C. The amine functions present can be completely or only partially quaternized.

Modifications of the copolymer from C) is not restricted to the use of a single type of modification. Instead, any modifications according to 1) to 4) can be carried out one after the other.

Perhaps the most preferred copolymers for use as oil demulsifiers according to the invention are I) acrylates or methacrylates of oxyalkylates based on monohydric or polyhydric alcohols, preferably mono-to hexahydric alcohols, most preferably mono- to trihydric alcohols. These acrylic esters have an average molecular weight of from about 150 to 20,000, preferably from about 400 to 15,000, most preferably from about 800 to 10,000; copolymerized with II) the hydrophilic comonomers of the formula heretofore set forth. The mixture of these comonomers preferably contains about 10 to 100% by weight of acrylic and/or methacrylic acid, most preferably from about 40 to 100% by weight of acrylic and/or methacrylic acid.

The claimed copolymers according to the various embodiments of the invention have k-values in the range of about 8 to 100, more preferably about 12 to 40.

The described copolymers can be characterized and their synthesis reaction can be controlled by determination of the k-value, the acid number, the hydroxy number and/or the ester number. The crude oil demulsifiers are preferably employed as solutions, because they can be metered more readily in this form. Therefore, the claimed demulsification composition for crude oils can be yielded direct from polymerization process and/or by diluting the described copolymer with an organic solvent comprising the group of solvents which are used for the polymer synthesis. Also suitable solvents are lower alcohols, mixtures of lower alcohols with water esters and amides of carbon acids, tetrahydrofuran, dioxane, light and heavy naphtha fractions and mixtures of these solvents.

Where solutions are used, as is preferred, they advantageously contain from about 0.5 to 60 percent by weight of the active ingredient, i.e. the emulsion breaker. Optionally these solutions can be mixed with common additives like, for example, corrosion inhibitors, deoilers and defoamers. All mixing and diluting manipulations are carried out by vigorous stirring.

For breaking the crude oil emulsions, the solutions are preferably added to the crude oils at the well head. This makes it possible for demulsification to occur at the temperature of the freshly raised water-in-oil emulsion and at a speed such that the emulsion has already broken when it reaches the processing installation. There it is easily separated into clean oil and brine in a suitable separator, which may or may not be heated, with or without the aid of an electric field.

The demulsifier compositions are advantageously added to the crude-oil emulsions in amounts of from about 0.5 to 10,000 ppm, preferably from about 1 to 1000 ppm, and even more preferably from about 2 to 200 ppm, based upon the weight of the emulsion to be broken, at temperatures of from about 20° to 80° C.

The method of rapid removal of water is applicable to crude oil emulsions from a great variety of origins, for example those from north Germany, the North Sea, the Gulf States of the U.S., the Near and Middle East, and Africa, etc. The demulsification composition is preferably used for crude oil emulsions containing from about 1 to 99% of water.

EXAMPLES a) Preparation of the oxyalkylated alcohols 31 g of trimethylolpropane and 0.3 g of potassium hydroxide are initially taken under a nitrogen atmosphere in an autoclave, and the mixture is reacted with 800 g of propylene oxide in the course of 10 hours at from 130° to 140° C. and under 6 bar. Thereafter, 101 g of ethylene oxide are added in a second stage at from 120° to 130° C. Toward the end of the reaction, the temperature is kept at 140° C. for 1 hour in order to obtain as complete conversion as possible. The molecular weight calculated from the measured OH number is 3820. This is Example a5 in the table below. For the sake of simplicity, a detailed description of the other examples is dispensed with. However, the reaction procedures are substantially the same as that of the above example. In reactions with mixed oxides, the particular alkoxides are mixed in a vessel and then metered.

c) Blocking of terminal groups of the alkoxides from a) and b)

200 g of the alkoxide from Example a15 are mixed with 8 g of 50% strength sodium hydroxide solution, and the alcoholate is prepared under reduced pressure at from 100° to 170° C.

Thereafter, 12.6 g of dimethyl sulfate solution are added dropwise at from 50° to 55° C., and, when the addition is complete, the check is made to determine whether free dimethyl sulfate is present. If necessary, the reaction is allowed to continue at from 60° to 70° C. until the test for free dimethyl sulfate proves negative. This is Example c1.

A) Preparation of the oxyalkylated ester monomers

TABLE 1

| | oxyalkylated alcohols according to a) | | | | | | | |
|---|---|---|---|---|---|---|---|---|
| Example | Alcohol | Parts of alcohol | Catalysts | Parts of catalyst | Parts of propylene oxide | Parts of butylene oxide | Parts of ethylene oxide | Structure |
| a 1 | Nonylphenol | 158 | KOH | 1.6 | 835 | — | 158 | Block |
| a 2 | Tallow fatty alcohol | 64 | KOH | 0.64 | 870 | — | 22 | Block |
| a 3 | Propylene glycol | 19 | KOH | 0.2 | 435 | — | 114 | Block |
| a 4 | Propylene glycol | 19 | KOH | 0.2 | 435 | — | 53 | Block |
| a 5 | Trimethylolpropane | 31 | KOH | 0.3 | 800 | — | 101 | Block |
| a 6 | Trimethylolpropane | 54 | KOH | 1.1 | 928 | — | — | — |
| a 7 | Trimethylolpropane | 47 | KOH | 1.4 | 677 | 677 | 154 | Block |
| | | | | | ⌊mixture⌋ | | | |
| a 8 | Trimethylolpropane | 27 | KOH | 0.8 | 1160 | — | 26 | Block |
| a 9 | Pentaerythritol | 27 | KOH | 0.3 | 928 | — | 35 | Block |
| a 10 | Pentaerythritol | 54 | KOH | 0.5 | 928 | — | 70 | Block |
| a 11 | Sorbitol | 91 | KOH | 0.9 | 870 | — | 88 | Block |
| a 12 | Sorbitol | 25 | KOH | 0.8 | 974 | — | 24 | Block |
| a 13 | Nonylphenol/ formaldehyde resin from b 1 | 153 | KOH | 1.5 | 830 | — | 24 | Block |
| a 14 | tert-butylphenol/ acetaldehyde resin from b 2 | 270 | KOH | 2.7 | 270 | — | 270 | Mixture |
| a 15 | Trimethylolpropane | 31 | KOH | 1.4 | 1073 | — | 305 | Block | b) Preparation of the alkylphenol/formaldehyde or acetaldehyde resins 119 g of xylene are added to 440 g of nonylphenol, and 60 g of paraformaldehyde are metered in at 40° C. Thereafter 1.5 g of dodecylbenzenesulfonic acid are added at 35° C., after which an exothermic condensation begins. The reaction temperature is kept at 65°–70° C. for 3 hours by cooling. The mixture is then heated at 90° C. for 2 hours. In order to complete the reaction, the mixture is refluxed for 4 hours at 95°14 100° C. Thereafter, the water of reaction is distilled off, and removal of water is completed by azeotropic distillation with xylene for 6 hours. After the mixture has cooled, the nonylphenol/formaldehyde resins is obtained as the 75–80% strength solution in xylene, having a medium viscosity. This is Example b1 in the table below.

1) 122 g of the product from Example a5 are mixed with 2.4 g of acrylic acid, 24 mg of hydroquinone monomethyl ether, 2.5 g of para-toluene sulfonic acid and 55 g of xylene under a nitrogen atmosphere. 0.6 ml of water is separated off in the course of 3 hours by heating at 150° C. To check for complete esterification, the acid number of the solution (ie. the amount of remaining free acrylic acid) is monitored. This number must drop from the theoretical starting value of 20 to at least 6 in order to indicate sufficient esterification. The acrylate is obtained as a clear 70% strength solution in xylene. This is Example A3 in the table below.

2) 609.4 g of the product from Example a15 are mixed with 7.9 g of acrylic acid, 79 mg of hydroquinone monomethyl ether, 7.6 g of para-toluene sulfonic acid and 268 g of xylene under a nitrogen atmosphere. 1.9 ml of water are

TABLE 2

| | alkylphenol/formaldehyde or acetaldehyde resins | | | | | | |
|---|---|---|---|---|---|---|---|
| Example | Alkylphenol t-butylphenol | Parts of alkylphenol | Aldehyde | Parts of aldehyde | Catalyst | Parts of catalyst | Parts of solvent |
| b 1 | Nonylphenol | 440 | Paraformaldehyde | 60 | Dodecylbenzene sulfonic acid | 1.5 | 199 |
| b 2 | t-butylphenol | 300 | Acetaldehyde | 86 | Dodecylbenzene sulfonic acid | 1.5 | 129 | separated off in the course of 3 hours by heating at 150° C. The acid number drops to a value of about 4.0 after 3 hours. When the esterification with acrylic acid is complete, the mixture is allowed to cool, 14.3 g of acetic anhydride are added and the mixture is heated for 2 hours at 100° C. This is Example A14 in the table below.

The procedure in the other example is similar. Longer or shorter reaction times may have to be used in order to achieve complete esterification and blocking of terminal groups.

hours at 100° C. This is Example B2 in the table below.

EXAMPLE 3

10 g of acrylic acid, 156 mg of 2,2'-azobisisobutyronitrile and 293 g of xylene are added to 707 g of a solution of the esterified alcohol prepared under A5, under a nitrogen atmosphere, and the solution is heated to 80° C. A solution of 62 g of acrylic acid and 62 g of xylene is then added dropwise in the course of 10 hours. When the addition is

TABLE 3

Esterification of the oxyalkylated alcohols from a) with acrylic acid or methacrylic acid

| Example | Unsaturated carboxylic acid | Parts | Oxyalkylated alcohol | Parts | Stabilizer | Parts mg | Catalyst | Parts | Parts of solvent | Comments |
|---|---|---|---|---|---|---|---|---|---|---|
| A 1 | Acrylic acid | 4 | a 2 | 189 | Hydroquinone monomethyl ether | 160 | p-toluene | 3 | 196 toluene | None |
| A 2 | Acrylic acid | 10 | a 1 | 222 | Hydroquinone monomethyl ether | 100 | " | 4.6 | 92 xylene | None |
| A 3 | Acrylic acid | 2.4 | a 5 | 122 | Hydroquinone monomethyl ether | 24 | " | 2.5 | 55 xylene | None |
| A 4 | Acrylic acid | 4 | a 7 | 222 | Hydroquinone monomethyl ether | 40 | " | 4.5 | 99 xylene | None |
| A 5 | Methacrylic acid | 5.2 | a 9 | 272 | Hydroquinone monomethyl ether | 52 | " | 5.6 | 121 xylene | None |
| A 6 | Methacrylic acid | 18.9 | a 10 | 263 | Hydroquinone monomethyl ether | 209 | " | 5.2 | 123 toluene | None |
| A 7 | Acrylic acid | 2.8 | a 12 | 256 | Hydroquinone monomethyl ether | 28 | " | 5.6 | 113 xylene | None |
| A 8 | Acrylic acid | 1.2 | a 8 | 91 | Hydroquinone monomethyl ether | 12 | " | 1.9 | 40 xylene | None |
| A 9 | Methacrylic acid | 3 | a 8 | 194 | Hydroquinone monomethyl ether | 30 | " | 4.1 | 86 xylene | None |
| A 10 | Methacrylic acid | 25 | a 3 | 220 | Hydroquinone monomethyl ether | 280 | " | 5.1 | 107 xylene | None |
| A 11 | Methacrylic acid | 9.4 | a 13 | 340 | Hydroquinone monomethyl ether | 80 | " | 9.2 | 154 xylene | None |
| A 12 | Acrylic acid | 4 | a 13 | 458 | Hydroquinone monomethyl ether | 40 | " | 8.8 | 202 xylene | None |
| A 13 | Acrylic acid | 4 | a 14 | 158 | Hydroquinone monomethyl ether | 36 | " | 4.3 | 71 xylene | None |
| A 14 | Acrylic acid | 7.9 | a 15 | 609 | Hydroquinone monomethyl ether | 79 | " | 7.9 | 268 xylene | Blocking of terminal groups with 70% acetic anhydride |
| A 15 | Acrylic acid | 7.9 | a 15 | 609 | Hydroquinone monomethyl ether | 79 | " | 7.9 | 268 xylene | None |
| A 16 | Acrylic acid | 4 | c 1 | 215 | Hydroquinone monomethyl ether | 36 | " | 19 | 238 xylene | None |

B) Copolymerization of the hydrophobic unsaturated esters from A) with comonomers

EXAMPLE 1

72 G OF ACRYLIC ACID, 284 MG OF 2,2'-azobisisobutyronitrile and 307 g of xylene are added, under a nitrogen atmosphere, to 587 g of a solution of the esterified alcohol prepared under A3, and the mixture is stirred at 80° C. for 3 hours and then heated at 110° C. for 2 hours. The resulting copolymer has K value of 28.3 (measured as a 1% strength solution in xylene). This is Example B1 in the table below.

EXAMPLE 2

212 mg of 2,2'-azobisisobutyronitrile are added to 764 g of a solution of the esterified alcohol prepared under A1, and the mixture is stirred for 2 hours at 90° C. under a nitrogen atmosphere. Thereafter, 72 g of acrylic acid and 72 g of xylene are added are stirring is continued for a further 15 complete, stirring is continued for 5 hours at 120° C. This is Example B3 in the table below.

EXAMPLE 4

95.8 g of acrylic acid, 0.94 g of n-butyraldehyde and 350 g of xylene are added to 893 g of a solution of the esterified alcohol prepared under A15, under a nitrogen atmosphere, and the stirred solution is heated to 90° C. A solution of 486 mg of 2,2'-azobisisobutyronitrile in 103 g of xylene is added dropwise in the course of 3 hours. When the addition is complete, the reaction is allowed to continue for a further 2 hours at 110° C. this is Example B16 in the table below.

95.8 g of acrylic acid, 436 mg of 2,2'-azobisisobutyronitrile and 453 g of xylene are added to 893 g of a solution of the esterified alcohol which is prepared as described under A14 and in which some of the terminal groups have been blocked, the addition being effected under a nitrogen atmosphere. The mixture is heated for 3 hours at 80° C., after which water is separated off as an azeotrope under reflux.

The product is obtained as a 50% strength solution in xylene and has a K value of 21.2 (measured as a 1% strength solution in xylene) and an OH number of less than 1. This is Example B17 in the table below.

The products below are synthesized similarly to the above Example. In the copolymerizations where two different esters from A) are used, both components are initially taken at the beginning of the polymerization and the procedures described in Examples 1 to 3 are followed. In the case of copolymerization with two different comonomers, both of these are added before the beginning of the reaction (similarly to Example 1) or the comonomer mixture is slowly added dropwise during the reaction (similarly to Example 3).

TABLE 4

Copolymers of hydrophilic acrylates or methacrylates and comonomers

| Example | 1st ester from example | 2nd ester from example | Parts Ester 1 | Parts Ester 2 | 1st Co-monomer | 2nd Co-monomer | Parts 1st Co-monomer | Parts 2nd co-monomer | Free radical initiator | Parts of free radical initiator (mg) | Duration (h) | Temperature (°C.) | Content of active ingredient (%) | Similar example |
|---|---|---|---|---|---|---|---|---|---|---|---|---|---|---|
| B 1 | A 3 | — | 587 | — | Acrylic acid | — | 72 | — | AIBN | 248 | 5 | 80–110 | 50 | 1 |
| B 2 | A 1 | — | 764 | — | Acrylic acid | — | 72 | — | AIBN | 212 | 17 | 90–100 | 50 | 2 |
| B 3 | A 5 | — | 707 | — | Acrylic acid | — | 72 | — | AIBN | 156 | 15 | 80–120 | 50 | 3 |
| B 4 | A 6 | — | 395 | — | Acrylic acid | — | 72 | — | AIBN | 144 | 15 | 80–115 | 50 | 1 |
| B 5 | A 2 | — | 229 | — | Acrylic acid | — | 86 | — | AIBN | 306 | 15 | 80–120 | 50 | 1 |
| B 6 | A 2 | A 3 | 229 | 587 | Acrylic acid | — | 144 | — | AIBN | 550 | 5 | 80–120 | 50 | 1 |
| B 7 | A 8 | — | 867 | — | Acrylic acid | — | 144 | — | AIBN | 393 | 5 | 80–110 | 50 | 1 |
| B 8 | A 4 | — | 358 | — | Acrylic acid | — | 50 | — | AIBN | 99 | 15 | 80–110 | 50 | 1 |
| B 9 | A 7 | — | 1045 | — | Acrylic acid | — | 29 | — | AIBN | 170 | 5 | 80–110 | 50 | 1 |
| B 10 | A 3 | — | 579 | — | Acrylic acid | Hydroxyethyl acrylate | 58 | 23 | AIBN | 267 | 13 | 80–120 | 50 | 1 |
| B 11 | A 3 | — | 579 | — | Acrylic acid | Vinyl acetate | 58 | 17 | AIBN | 258 | 15 | 80–120 | 50 | 1 |
| B 12 | A 3 | — | 579 | — | Acrylic acid | Styrene | 58 | 21 | AIBN | 263 | 15 | 80–110 | 50 | 1 |
| B 13 | A 12 | — | 1307 | — | Acrylic acid | — | 176 | — | AIBN | 459 | 15 | 80–110 | 50 | 1 |
| B 14 | A 3 | — | 587 | — | Acrylic acid | — | 72 | — | Dibenzoyl peroxide | 366 | 15 | 100–120 | 50 | 1 |
| B 15 | A 2 | A 7 | 229 | 1045 | Acrylic acid | Hydroxyethyl acrylate | 130 | 58 | Dibenzoyl peroxide | 817 | 15 | 100–120 | 50 | 1 |
| B 16 | A 15 | — | 893 | — | Acrylic acid | — | 95.8 | — | AIBN | 486 | 5 | 90–110 | 50 | 4 |
| B 17 | A 14 | — | 893 | — | Acrylic acid | — | 95.8 | — | AIBN | 453 | 6 | 80–145 | 50 | 5 |
| B 18 | A 15 | — | 893 | — | Acrylic acid | — | 95.8 | — | AIBN | 453 | 5 | 80–110 | 50 | 1 |
| B 19 | A 16 | — | 238 | — | Acrylic acid | — | 36.0 | — | AIBN | 164 | 6 | 80–145 | 50 | 5 |

C) Blocking of terminal groups and neutralization of the catalytic amounts of acid after the polymerization is complete The Example below, in which 70% of the OH groups still present are blocked with acetic anhydride and subsequently further esterification of the remaining OH groups by azeotropic esterification and neutralization of the p-toluene sulfonic acid with tributylamine are carried out, is only intended to serve as an example of the possibilities of blocking terminal groups and of neutralization. The high the proportion of free OH groups after blocking of the terminal groups, the more sharply does the K value of the polymer increase in the subsequent azeotropic esterification.

EXAMPLE 1

95.8 g of acrylic acid, 453 mg of 2,2'-azobisisobutyronitrile and 460 g of xylene are added to 893 g of a solution of the esterified alcohol prepared under A15, under a nitrogen atmosphere, and polymerization is carried out for 3 hours at 80° C. The K value of the resulting copolymer is 13.2 (measured as a 1% strength solution in xylene). The solution is allowed to cool, 14.3 g of acetic anhydride are added, the mixture is heated at 100° C. for 3 hours and then at 140°–145° C. for 3 hours and water is separated off as an azeotrope. After the mixture has been cooled to 40° C., 7.7 g of tributylamine are added and stirring is continued for a further 2 hours. The product is obtained as a 50% strength solution in xylene, having a medium viscosity. The K value is 23.8 (measured as a 1% strength solution in xylene), and the OH number is less than 1. This is Example C1 in the Table below.

TABLE 5

Copolymers of hydrophilic acrylates with acrylic acid (with subsequent blocking of terminal groups)

| Example | Ester from example | Parts of ester | Parts of acrylic acid | Parts of AIBN | Duration of polymerization | Temp. of polymerization | Blocking component | Amount g | Time h | Temp. °C. | Subsequent esterification | Active ingredient % |
|---|---|---|---|---|---|---|---|---|---|---|---|---|
| C 1 | A 15 | 893 | 95.8 | 453 | 3 h | 80° C. | Acetic anhydride | 14.3 | 3 | 100 | yes | 50 |
| C 2 | A 3 | 579 | 72 | 340 | 3 h | 80° C. | Acetic anhydride | 14.3 | 3 | 100 | yes | 50 |

D) Modification of the copolymers prepared under B) and C)

The Examples below are intended to serve merely as examples of the modifications which can be carried out to the polymers from B) and C).

a) Mixing with oxyalkylated alcohols and/or cosurfactants 1. 966 g of a solution of the copolymer prepared under B1 are mixed with 61 g of the alcohol oxyalkylated under a14 and 61 g of xylene.
2. 768 g of a solution of the copolymer prepared under B9 are mixed with 128 g of dodecyl bisulfate and 1613 g of methanol.

b) Partial esterification of the mixtures prepared under C) 50 g of a solution of the product from B14 are mixed with 6.5 g of the oxyalkylated alcohol prepared under a13 and 6.5 g of that prepared under a14, and 52 g of xylene are also added. 0.8 ml of water is separated off in the course of 4 hours by refluxing.

c) Subsequent crosslinking of the copolymers from B) 1 g of a bisglycidyl ether of bisphenol A (Epikote) is added to 50 g of a solution of the product from B10, and the mixture is heated at 100° C. for 8 hours. The viscous solution is diluted by adding 35 g of xylene.

d) Subsequent oxyalkylation of the copolymers prepared under B) and C) with ethylene oxide and/or propylene oxide and/or butylene oxide1 g of potassium hydroxide is added to 100 g of a solution of the copolymers prepared under B7, and the mixture is reacted with 50 g of propylene oxide under 6 bar and at 130°–140° C. in an autoclave. When the reaction is complete, 290 g of ethylene oxide are metered in a little at a time at from 120° to 130° C. Toward the end of the reaction, the temperature is increased to 150° for 2 hours.

The following examples describe the testing results for the demulsifier compositions obtained from the copolymers set forth as examples B1 to B19. For these tests, a certain number of ppm of the demulsifier was added to different provenances (Ruhlermoor/Georgsdorf and Adorf/Scherhorn) of crude oil emulsions, while stirring, and the mixture was then left to stand at constant temperature. The amount of water which had separated off was recorded at various intervals of time. The values in the tables give the percentage by volume of separated water concerning the total amount of water (100%) in the crude oil emulsion.

Crude Oil Emulsion A
Provenance: Ruhlermoor/Georgsdorf
Water content: 45% by volume
Temperature: 50° C.

TABLE 1

| Example | Amount in ppm | Water separated minutes | | | | out in %, after hours | | |
|---|---|---|---|---|---|---|---|---|
| | | 10 | 20 | 30 | 45 | 1 | 2 | 4 |
| B 1 | 5 | 2 | 11 | 33 | 69 | 93 | 100 | 100 |
| B 7 | 5 | 2 | 7 | 11 | 31 | 53 | 95 | 98 |
| B 16 | 5 | 0 | 2 | 9 | 55 | 78 | 89 | 89 |
| B 18 | 5 | 0 | 0 | 0 | 7 | 15 | 71 | 71 |

Crude Oil Emulsion B
Provenance: Adorf/Scherforn
Water content: 55% by volume
Temperature: 55° C.

TABLE 2

| Example | Amount in ppm | Water Separated minutes | | | | out in %, after hours | | |
|---|---|---|---|---|---|---|---|---|
| | | 10 | 20 | 30 | 45 | 1 | 2 | 4 |
| B 1 | 10 | 0 | 4 | 7 | 16 | 25 | 91 | 98 |
| B 7 | 10 | 0 | 2 | 4 | 7 | 14 | 54 | 74 |
| B 16 | 10 | 0 | 4 | 4 | 5 | 9 | 47 | 65 |
| B 18 | 10 | 4 | 5 | 11 | 16 | 33 | 82 | 87 |

While the invention has been described in each of its various embodiments, it is expected that certain modifications thereto may be contemplated and effected by those skilled in the art without departing from the invention's true spirit and scope as set forth in the specification and the accompanying claims.

What is claimed is:

1. A method of demulsifying a crude oil and water mixture, which method comprises adding to the mixture an oil and water demulsifying effective amount of a copolymer which is the copolymerization reaction product of:

A) an acrylate or methacrylate of an oxyalkylate of the formula

$$R^1-O-[-AO-]_x-H$$

where $R^1$ is a radical of a monohydric or polyhydric alcohol or alkylphenol or a radical of an alkylphenol/ formaldehyde or alkylphenol/acetaldehyde condensate, AO is an ethylene oxide, propylene oxide or 1,3-butylene oxide radical or a mixture of these radicals or blocks of these radicals and x is from 5 to 120, B) a hydrophilic comonomer of the formula

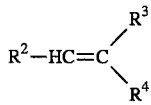

wherein
$R^2$ is hydrogen,

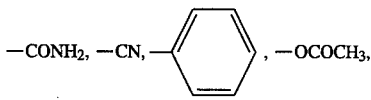

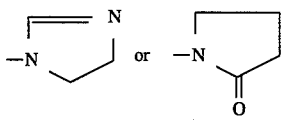

$R^3$ is hydrogen or —COOH and
$R^4$ is hydrogen or —CH$_3$,
such that one or more of the radicals is a hydrophilic group, and the weight ratio of A) to B) being from 300:1 to 1:50, and further wherein said reaction product has all or at least some of its free hydroxyl groups blocked.

2. The method as claimed in claim 1, wherein said free OH groups are esterified or etherified prior to the copolymerization of A) and B).

3. The method as claimed in claim 1, wherein said free OH groups have been blocked after the copolymerization of A) and B).

4. The method as claimed in claim 1, wherein the acid used in the esterification is neutralized by adding an amine.

5. The method as claimed in claim 1, wherein said acrylate or methacrylate of said oxyalkylate is based on monohydric or polyhydric alcohols.

6. The method as claimed in claim 1, wherein said copolymer is in solution form, said solution comprising about 0.5 to 60 percent of said copolymer.

7. The method as claimed in claim 1, wherein said copolymer is added in amounts of from about 0.5 to 10,000 ppm relative to said crude oil and water mixture.

8. The method as claimed in claim 7, wherein said copolymer is added in amounts of from about 1 to 1000 ppm relative to said crude oil and water mixture.

9. The method as claimed in claim 8, wherein said copolymer is added in amounts of from about 2 to 200 ppm relative to said crude oil and water mixture.

10. The method as claimed in claim 9, wherein said crude oil and water mixture comprises about 1 to 99% water.

11. The method as claimed in claim 10, wherein said acrylate or methacrylate of an oxyalkylate of the formula

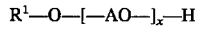

is based on monohydric or polyhydric alcohols having a molecular weight of about 150 to 20,000.

12. The method as claimed in claim 11, wherein said acrylate or methacrylate of an oxyalkylate of the formula

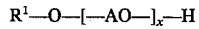

is based on mono- to hexahydric alcohols having a molecular weight of about 400 to 15,000.

13. The method as claimed in claim 12, wherein said acrylate or methacrylate of an oxyalkylate of the formula

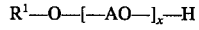

is based on mono- to trihydric alcohols having a molecular weight of about 800 to 10,000.

14. The method as claimed in claim 12, wherein said copolymer comprises about 40% to 100% by weight of acrylic and/or methacrylic acid.

* * * * *